May 3, 1966    J. S. SWEARINGEN    3,248,891
METHOD AND APPARATUS FOR CONTROL OF OPERATING CONDITIONS
IN ABSORPTION REFRIGERATION SYSTEMS
Filed April 26, 1963    4 Sheets-Sheet 1

JUDSON S. SWEARINGEN
INVENTOR.

BY *Philip Subkow*

ATTORNEY

JUDSON S. SWEARINGEN
INVENTOR.

BY *Philip Subkow*

ATTORNEY

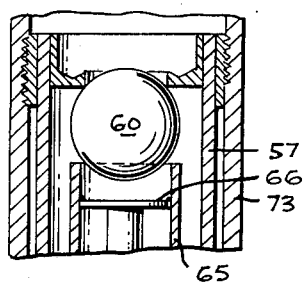
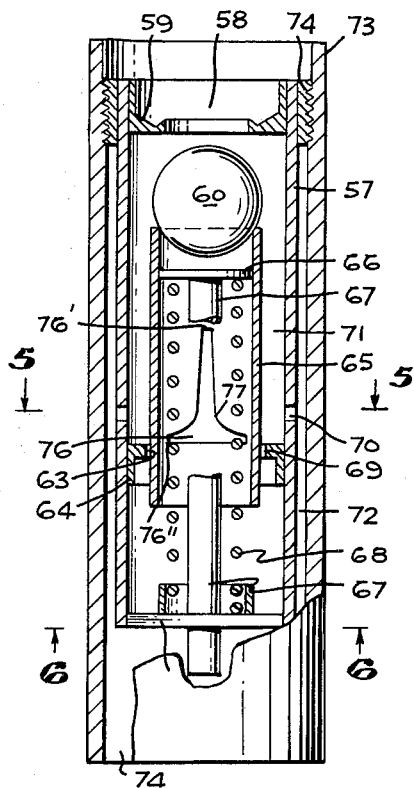
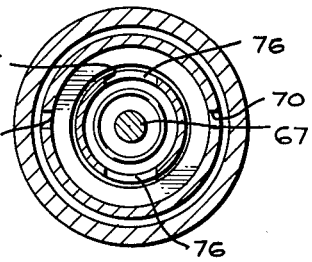
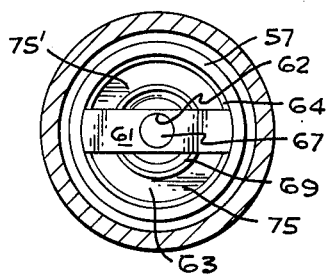
INVENTOR.
JUDSON S. SWEARINGEN
BY
ATTORNEY May 3, 1966  J. S. SWEARINGEN  3,248,891
METHOD AND APPARATUS FOR CONTROL OF OPERATING CONDITIONS
IN ABSORPTION REFRIGERATION SYSTEMS
Filed April 26, 1963  4 Sheets-Sheet 4

INVENTOR.
JUDSON S. SWEARINGEN
BY
ATTORNEY.

United States Patent Office 3,248,891
Patented May 3, 1966

3,248,891
METHOD AND APPARATUS FOR CONTROL OF OPERATING CONDITIONS IN ABSORPTION REFRIGERATION SYSTEMS
Judson S. Swearingen, Los Angeles, Calif., assignor to Electronic Specialty Co., Los Angeles, Calif., a corporation of California
Filed Apr. 26, 1963, Ser. No. 276,031
13 Claims. (Cl. 62—104)

This application is a continuation-in-part of application Serial No. 221,194, filed September 4, 1962, now Patent No. 3,187,515, and Serial No. 157,170, filed December 5, 1961, now Patent No. 3,146,602, and copending application Serial No. 159,531, filed December 15, 1961.

This invention relates to the control of operating conditions in absorption refrigeration systems. While my invention is applicable to such systems employing various absorbing liquids and refrigerants it is particularly adapted to systems where the absorbing liquid is an aqueous salt solution and the refrigerant is water which is evaporated in an evaporator at low temperature obtained by maintaining the evaporation zone at a pressure sufficiently low to reduce the vaporizing temperature in the evaporator to the desired low degree. Refrigeration is obtained by circulating a fluid in heat exchange with the evaporating refrigerant.

It is necessary to limit the temperature in the evaporator to be above the freezing point of water and also to insure that the temperature in the evaporator does not rise so high as to impair the refrigeration efficiency.

An important control to insure that the temperature in the evaporator is safely within the above limits is the rate of circulation of the salt solution.

In absorption refrigeration systems in which the low pressure in the evaporator is obtained by absorbing the water vapor from the evaporator into a circulating stream of salt solution, for example, lithium bromide solution, the diluted absorbent salt solution, formed in the absorption zone, is passed to a regenerator where the salt solution is heated and the water solvent is partially vaporized. The vapors are separated from the partially concentrated salt solution, and the concentrated salt solution is cooled and introduced into the absorber, where it passes over coils through which a cooling fluid passes. The vapors from the evaporator pass into contact with the absorbent liquid in the absorption zone and are thereby absorbed.

The temperature in the evaporator depends on the pressure established in the vapor space of the evaporator. In absorption refrigeration systems this is controlled by the pressure in the vapor space of the absorber which is in vapor communication with the vapor space in the evaporator. The pressure in the vapor space of the absorber is established by the vapor pressure of the absorbent liquid in the absorber. Where absorbent liquid is a salt solution, this depends on the concentration of the salt solution and its temperature. If the vapor pressure of the absorbent liquid becomes too low, either because the concentration of the absorbent liquid is too high in salt, or its temperature is too low, the temperature in the absorber may reach that of melting ice and freezing up of the evaporator occurs.

Where centrifugal pumps are employed to circulate the diluted salt solution from the absorber to the generator where the salt solution is concentrated, the circulation rate varies with the pressure against which the pump discharges. Variations in the pressure in the regenerator produces such variations in pressure against which the pump discharges and variations in the volume rate of circulation occur.

If the pressure against which the pump discharges increases, the pump not being otherwise regulated, the volumetric flow rate of the liquid from the pump to the regenerator decreases.

A reduced rate of circulation through the heater of the regenerator will, unless the heating is moderated, cause an increase in the temperature of the circulating salt solution passing through the heater. This causes an increase in the pressure in the regenerator and a consequent increase in the back pressure of the circulating pump. The increase in temperature of the salt solution in the regenerator causes an increase in pressure of the water vapor. This increase, if allowed to continue, may increase the pressure above a safe limit. This may cause safety controls to shut the system down for example, by interrupting the heat input to the regeneration zone. The effect of the reduced circulation rate thus multiplies and eventually the rate of circulation becomes too low for efficient operation of the system.

Another consequence of such excessive reduction in circulation rate is that the increase in temperature and excessive evaporation of water may so concentrate the solution sufficiently so as to solidify it.

If the pressure in the regenerator falls, thus reducing the back pressure on the pump, an increase in the circulation rate and reduction of the temperature of the salt solution passing through the regenerator unit results, unless again the heater is controlled to hold the required temperature. The reduction in temperature of the heated solution reduces the pressure in the regenerator and thus further reduces the back pressure on the pump and thus further increases the circulation rate.

The increase in circulation rate thus progressively reduces the pressure and temperature in the regenerator and thus introduces salt solution, which progressively becomes more and more dilute, into the absorber. This circulation of excessively diluted salt solution is wasteful of heat. The unit operates at low efficiency.

The variations in pressure in the regenerator which may cause these fluctuations in circulation rate may result from variations in power to the pump and also from variations in pressure produced by the periodic venting of gases from the regenerator to ambient or from other process variations in the system.

One system for venting these gases is disclosed in my application Serial No. 221,194, now Patent No. 3,187,515. Another is disclosed in my copending application, Serial No. 275,843, now Patent 3,167,928.

Venting of gases from the regenerator units affects the pressure in the regeneration zone due to cycling of pressure in the venting of fixed gases from the regeneration zone. Thus, as will be described more fully below, the gases may be periodically vented to ambient pressure through a vent valve and the valve is shut so that pressure again seeks its operating level. This pressure level may be below atmospheric pressure. When venting of fixed gases is again to be accomplished, pressure is raised above atmospheric pressure, the gases are vented and pressure is maintained superatmospheric during the venting stage and the valve again is closed and the pressure in the regenerator may again drop. In the absence of circulation rate control, a variation in the circulation rate will result. When the regeneration zone pressure is increased preparative to venting of gases and maintained during venting, the circulation rate decreases progressively during this venting period. When the vent valve is closed, and the pressure drops, the circulation rate is increased progressively. This variation in circulation rate will have the effects previously described.

It is an object of my invention to prevent in a substantial and practical way the deleterious effects of the variations in the circulation rate of the diluted salt solution flowing from the absorber to the regenerator.

It is an object of my invention, in an absorption refrigeration process, to control the circulation of the absorbing liquid passing to the regenerator to maintain the rate of circulation substantially constant notwithstanding variations in pressure in the regenerator.

It is a further object of my invention to apply this control to an absorption refrigeration process using water as the refrigerant and aqueous salt solution as the absorbing liquid.

It is a further object of my invention to maintain the circulation of the liquid passing to the regenerator substantially constant in a cyclic gas venting process, whereby the pressure in the regenerator is elevated to super-ambient pressure prior to venting the uncondensed gases which are liberated in the regeneration step and to maintain the super-ambient pressure during venting and then the pressure is reduced in the regenerator during a period when the gases are not vented.

It is a further object of my invention to design a valve to be used at the discharge outlet of a centrifugal pump employed in pumping absorption liquid to the regenerator, which valve will maintain the volumetric flow rate of the liquid passing to the regenerator substantially constant irrespective of variations in pressure drop through the valve.

For this purpose, I have designed a valve having a variable area orifice positioned between the inlet and outlet of said valve, whose orifice area, taken together with any fixed area ports which may be used, is made inversely proportional to the square root of the pressure drop across the orifice.

For this purpose, I provide a valve member which has a characterized port such that as the valve member is displaced by application of the pressure head between the inlet and outlet of the valve. The orifice becomes of a lesser and lesser area in an exponential manner related to the change in pressure head in such way that the variable area of the orifice area plus any fixed ports in the valve, through which fluid may pass, is maintained substantially and inversely proportional to the square root of the pressure head between the inlet and outlet of said valve. To do so, I design the variable area orifice so that the available orifice area of the variable orifice, for the passage of fluid through the orifice, is a linear function of $(D)^{-1/2}$ where D is the displacement of the valve member from its position, which displacement occurs where no flow occurs, upon imposition of a pressure head across the variable orifice.

A suitable design for this purpose is according to my invention made such that the dimension of the orifice measured in the direction perpendicular to the direction of the displacement of the valve member, is a linear function $(D)^{-3/2}$.

These and other objects of my invention will be further described in connection with the drawings of which:

FIG. 4 is a section through a flow valve of my invention useful in the system of my invention;

FIG. 5 is a section on line 5—5 of FIG. 4;

FIG. 6 is a section on line 6—6 of FIG. 4;

FIG. 7 is a fragmentary view of the valve in seated position;

While the circulation control of my invention is applicable to all forms of absorption refrigeration systems employing single-effect or multiple-effect regeneration systems, and to all forms of refrigerant liquids in which the liquid is vaporizable at the pressure established by absorption of the generated vapors, it finds particularly useful application in systems in which the refrigerant is water, and the refrigeration occurs by the evaporation of the water at a low pressure as described above and as will be more fully described below.

Figure 1:
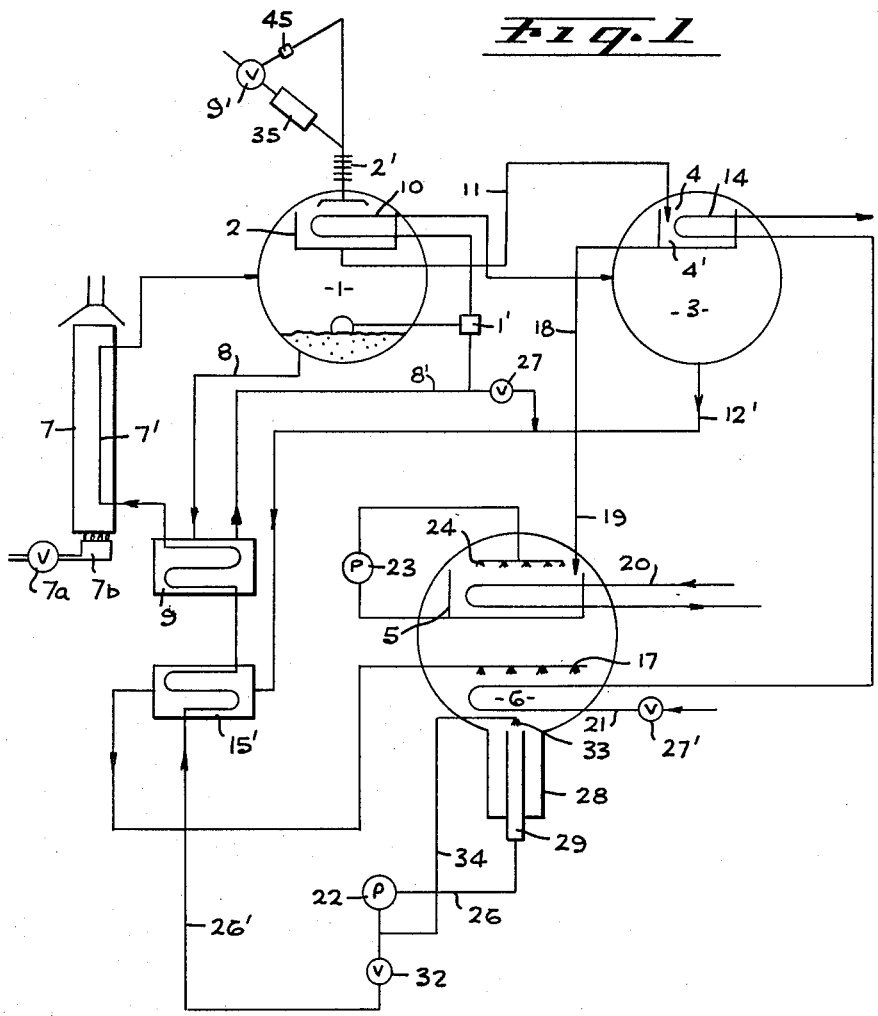
FIG. 1 shows the application of my system to a multiple-effect absorption refrigeration system.

In the following description I will illustrate my invention by salt solution in a multiple effect system as illustrated by FIG. 1. But as will be apparent to those skilled in this art, the invention is applicable to other systems employing refrigerant liquid other than water, and absorbent liquids other than salt solution in either single or in multiple-effect systems.

In FIG. 1, the absorption liquid, which, for example, may be a salt solution, preferably a solution of lithium bromide in water carrying some fixed gas passing through tubes 7', is heated in heater 7 to the vaporization point and introduced into a separation zone 1, where the unvaporized concentrated lithium bromide solution is separated from the water vapor. The pressure in the separating zone may be any suitable pressure. This pressure may vary from about a third of an atmosphere to about one atmosphere absolute pressure, depending on the load, i.e., the amount of heat to be removed in the refrigerant evaporator and on the temperature of the cooling fluid passing through 21 and 14.

The water vapor containing fixed gas is passed to a condensing zone 2. The partially concentrated solution collecting in 1 is passed via line 8 and cooled by heat exchange in 9, in indirect heat exchange with the relatively cooler, dilute lithium bromide solution passing to the heating tubes 7' positioned in heater 7 fired by the gas burner 7b controlled by valve 7a. The partially concentrated solution is thus cooled to a lower temperature and is passed via line 8', under control of a float valve 1' via coil 10 in indirect heat exchange, in the condenser 2, with the water vapor and fixed gas separated in the aforementioned separating zone 1. The water condensate accumulates in the separating zone of the condenser 2.

A portion of the flow through line 8' may be by-passed via valve 27 directly into line 12' as described below.

Uncondensed gas substantially but not entirely free of water vapor passes through the air cooler 2' into holding zone 35 (see FIGS. 1 and 2), to be described more fully below, where vapors are condensed by heat exchange with the wall of 35. Fixed gas is discharged to ambient pressure through vent valve 9'.

The water condensate thus produced is passed from the condenser 2 through pipe 11 and is discharged into the second-effect condensation zone 4', operating at the lower pressure of zone 3. This is preferably at a low subatmospheric pressure. I may employ the method and devices for controlling the flow of liquid from 2 into 4' described in my application Serial No. 159,708 filed December 15, 1961, now Patent No. 3,146,604 which is herewith incorporated by this reference.

The partially concentrated lithium bromide solution from 1, in passing through 10 (valve 27 being closed), is partially vaporized in 10 as it passes to the lower pressure separating zone 3. In the above case where the pressure in the separator 1 is between about one-third to one atmosphere, the pressure in the separator 3 may be of the order of about .3 to 1.5 pounds per square inch absolute, depending on the concentration of the salt solution. In passing through 10, the salt solution abstracts heat from the vapor and gas in the condenser 2.

By opening valve 27, part of the circulating salt solution from the separator 1 may be by-passed directly into line 12'. Less salt solution circulating through coil 10 reduces the cooling effect in condenser 2 and the pressure and temperature in 2 increases.

The higher the temperature of the salt solution in the separator 1, the hotter is the salt solution passing from the heat exchanger 9 through the coil 10. This will further reduce the condensation effect in the condenser 2. Pressure in the separator 1 will start to climb.

Unless circulation rate from the absorber is controlled, the increase in back pressure will cause the centrifugal pump to circulate less and less salt solution as the pressure in the separator 1 increases. If heat input to the heater 7 is not reduced, a further increase in temperature and pressure will result due to this reduced rate of circulation of salt solution through the heater. This will further increase the pressure in the separator 1.

The consequences of such increase in temperature and pressure have been described above. In order to avoid these consequences, absorption refrigeration processes have employed shut off safety controls. For example, when the pressure in the regenerator section of a single or multiple effect absorption refrigeration rises to too high a value, the fuel input to the burner used to fire the heater of the regeneration is closed. The system shuts down. It must be started all over again.

In the system of my invention, these and other difficulties described above, are obviated by maintaining a constant volumetric flow rate from the centrifugal pump 22 as will be described below.

Referring again to FIG. 1, unvaporized concentrated solution and vapor generated in 10 are separated in 3. The vapor enters the condenser section 4', where it is commingled with the flashed condensate from 2. The combined water vapor is condenser in 4' by heat exchange with cooling liquid passing through coil 14.

The commingled water condensate from 4' then passes through line 18 and is introduced via pipe 19 into refrigerator evaporator 5, operating at a still lower pressure. The condensate from 19 passes in heat exchange with fluid in 20, for example, water, which is to be cooled in the refrigeration process. The unvaporized liquid in 5 is circulated by pump 23 through spray 24. The water condensate is thus vaporized, and the fluid in 20 is cooled.

The concentrated solution in 3 is passed via line 12', heat exchanger 15', where it is cooled, and enters 6 via sprays 17. The water vapor from 5 is absorbed in 6, in the concentrated lithium bromide solution introduced via 17, cooled by cooling liquid passed through 21 in series with coil 14.

The vapor pressure of the absorbent liquid in the absorber 6 is lower than the vapor pressure of the liquid in 3, and establishes the pressure in the refrigerator evaporation zone 5. Thus, depending on the temperature of the cooling water, and therefore the temperature of the absorbing liquid and the salt concentration, the pressure may be of the order of a few millimeters of mercury absolute pressure and sufficient to establish any desired temperature of the water in contact with the coils 20. The diluted lithium bromide solution passing through tube 29 is pumped by pump 22 and line 26 through heat exchangers 15' and 9 to the heater 7.

The process of my invention permits of the removal of fixed gas and its discharge through valve 9', without material loss of water vapor, as will be more fully described below.

It is thus one of the advantages resulting from the use of my process that, because there is no substantial loss of water vapor, the safe concentrations of salt in the various stages of the operation may be maintained substantially constant, and the operation may be thus made cyclic and continuous. Any substantial loss of water vapor in the vent gas as described above would result in a gradual concentration of the salt solution and thus cause an excessive concentration of salt, requiring periodic additions of water or adjustment of the temperature and pressure levels in the system.

In order to transport fixed gas from the absorber to the gas venting system, I may and preferably do, employ means to withdraw vapor and fixed gas from the absorber, along with the diluted salt solution in 6. Fixed gas in 6 unabsorbed in the salt solution is commingled with the liquid in 6 and conveyed, together with this liquid, through heater 7 and introduced into 1.

Figure 2:
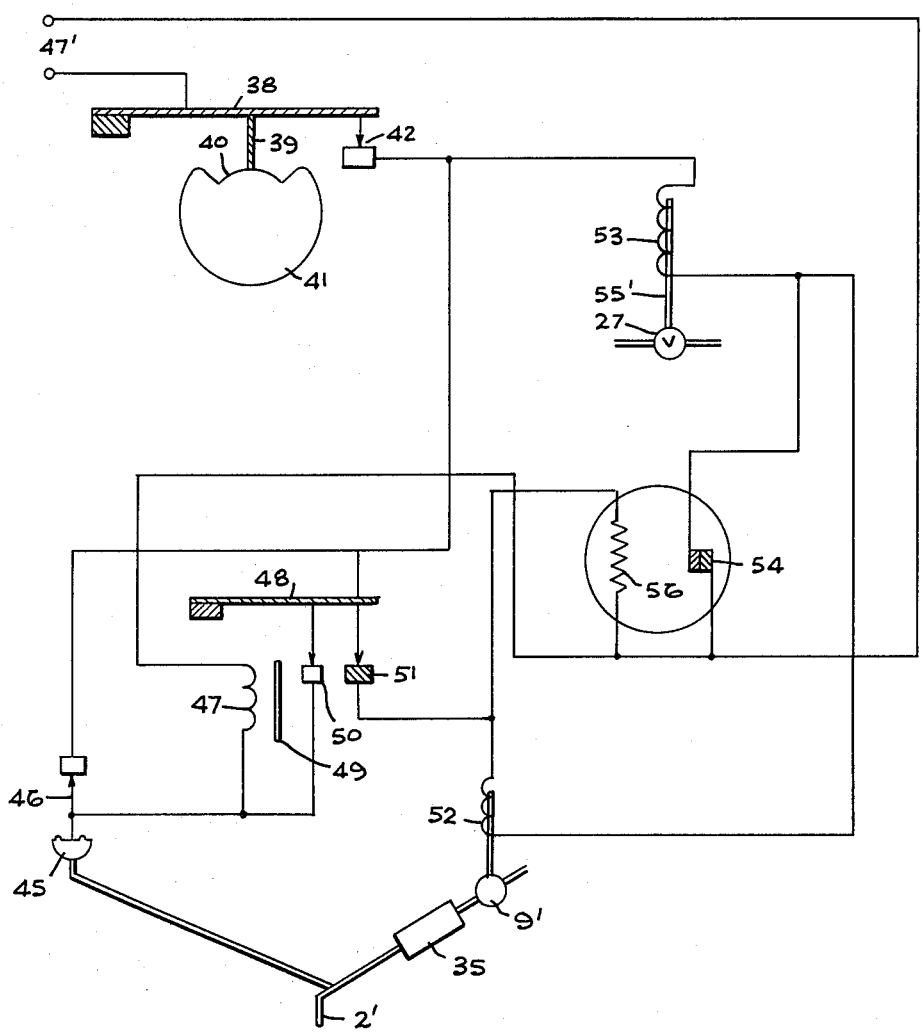
FIG. 2 illustrates a control system for the operation of the valve employed in the previous figure.
Figure 3:
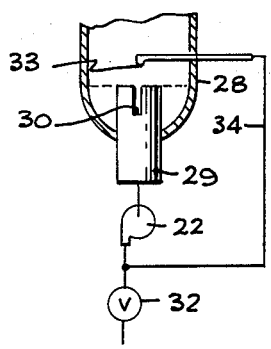
FIG. 3 is a detail of FIG. 1.

FIGURES 1, 2 and 3 illustrate a means for this purpose, described and claimed in my application, Serial No. 157,170, filed December 5, 1961 now Patent No. 3,416,- 602. The chamber 6 is provided with a sump 28 in which the diluted salt solution is accumulated. Mounted in the bottom of this sump is a vertical tube 29, slotted at the top at 30. A nozzle 33 is mounted so that it is in axial alignment with the tube 29. Tube 29 is connected to pump 22 by line 26. The output of the pump 22 is split by valve 32, the stream through 32 passes to heat exchanger 15' via line 26'; and remainder of the stream from 32 enters the nozzles 33 via line 34. The jet stream from the nozzle falls inside tube 29. Liquid in the sump 28 also enters the tube through the slot 30.

The multiple, discontinuous streams of discrete liquid bodies in spray form from the nozzle 33 impinge on the surface of the moving column of liquid in tube 29 in a statistical manner, so as to form changing zones of turbulence across the surface of the liquid. The liquid forms pockets in which the gas and vapor are entrapped in the form of bubbles. The flowing liquid stream receives additional liquid from the sump through the slot 30.

The multiple streams of liquid coalesce into a gas-liquid body to form a coherent but heterogeneous mixture of gas and liquid in 29, where the liquid is the continuous phase and the gas is the dispersed phase.

The heterogeneous stream of liquid and gas falls through a head to the pump 22 at a velocity sufficient to overcome the separating tendency of the gas bubbles. As the liquid falls, the hydrostatic pressure on the bubbles increases. Substantially all of the vapor is absorbed, due to the increase in pressure, and the residual gas is compressed to form smaller bubbles. Due to the condensation of vapor and compression of the gas, the liquid-gas mixture is introduced into the pump 22 without substantial separation of gas from its dispersion in the liquid. The heterogeneous gas and liquid dispersion is thus a pumpable mixture and not a froth.

The fixed gas and diluted salt solution are then passed to the heater 7 and into the separator 1. By regulating the rate of recirculation of the liquid through 34 and 33, the rate of fixed gas removal from 6 may be made sufficiently great to permit of the maintenance of the desired low partial pressure of gas in the absorber 6. This is aided in a material sense because the volume of gas to be removed is minimized. It is that which is currently generated in the system and which enters through leaks. As stated above, the gases are vented to atmosphere through the holding space 35.

The normal operating condition is with valve 9' closed and valve 27 closed. During this period, as vapor and gas enter the holding chamber 35, the vapor is condensed by heat transfer to the wall 35, and through the wall 35. The condensate drains back to 2. Gas thus accumulates in the upper portion of chamber 35 and may eventually fill chamber 35.

The control circuit for operating the venting system is shown schematically in FIG. 2. At the start of the cycle, with valve 9' and valve 27 closed, the rod 39 attached to the flexible arm 38 of the switch 42 enters the notch 40 of the cam disc 41 which is rotated by a clock mechanism. Such time-controlled switches the conventional and need not be further described. With the arm 38 in the position as illustrated, the switch 42 is closed and remains closed for a period of time, depending on the arcuate extension of the notch 40 and the speed of rotation of the disc 41. Assuming that the pressure in chamber 35 is below that desired to be present before valve 9' is opened, the pressure transducer 45 which is in the form of a pressure switch, connected to line 2', will not close the switch 46, and the circuit through coil 47 and switches 50, 51 and coil 56 is open. The circuit from the power input terminals 47', through 42, solenoid coil 53, and switch 54 is closed. Switch 54 is part of a time delay switch of conventional design, in which a current passing through a heating coil 56 heats an element which causes the switch 54 to open. When the current through heater coil 56 is interrupted at switch 51, as described below, switch 54 closes after a short period of time to permit cooling of 56. Switches of this character are well known and commercially available.

Switch 54 being closed, the solenoid coil 53 is energized, and the solenoid core opens the by-pass valve 27. The switch 46 being open, coil 47 and heating coil 56 are not energized, and the switches 50 and 51 being open, as stated above; coil 52 is not energized, and the valve 9′ remains closed while valve 27 opens.

The opening of the by-pass valve 27 causes the pressure in the first-effect condenser to rise, as described above. When the pressure has risen to a safe, predetermined upper value, the pressure transducer 45 operates to close switch 46.

The closing of the switch 46 completes the circuit in coil 47, and the core 49 pulls the spring arm 48 down to close the switches 50 and 51. This completes the circuit in solenoid coil 52 and heater 56. The solenoid coil 52 is energized and the solenoid armature opens valve 9′.

The switch 54 does not open until the heater coil 56 has been energized for a predetermined interval of time, that is, until the temperature at the switch 54 has risen sufficiently to open the switch 54, whereupon the coil 53 and coil 52 are de-energized and the by-pass valve 27 and valve 9′ are closed.

The above interval of time between the closing of the switch 46 and 51 to open 9′, and the opening of the switch 54 to close valves 9′ and 27, is designed to permit the gas in the holding zone 35 to vent. The interval is, however, not long enough to permit the entry of vapor to fill the zone 35 and be discharged through valve 9′, during the interval in which the valve 27 remains open.

Before vapor can reach the valve 9′ and be vented, the switch 42 opens, and the circuit is de-energized, and valves 9′ and 27 close.

The closing of valve 27 passes the full flow of the salt solution from 1 through 10, causing the pressure in the first-effect condenser 2 to drop. When the pressure has dropped to a predetermined level, the pressure transducer 45 opens switch 46. The solenoid coil 47 is shorted by 50 as 48 is held down, notwithstanding the opening of switch 46. This keeps 51 closed, and 56 hot, and therefore 54 open and 27 closed, and 9′ closed.

This condition obtains until the arm 39 rides out of the notch 40, whereupon circuit is broken at 42, all switches other than 54 are open, and switch 54 closes soon after, due to the rapid cooling at the switch 54, heater 56 being de-energized. This condition obtains until the cam disc rotates, to permit the arm 39 to again enter the cam disc notch.

It will be seen that the temperature rise in the heater 7 and in the first-effect is thus limited to the interval of time during which the valve 27 is open. For most of the time, during which the arm 39 is out of the notch 40, the system operates at lower temperatures.

The cycle is thus ready to be repeated after a period of time determined by the timer motor and cam, as stated above. It will be seen that the temperature rise in the heater 7 and in the first effect is thus limited to the interval of time during which the valve 27 is open. For most of the time, during which the arm 39 is out of the notch 40, the system operates at lower temperatures.

The above system is also described in my copending application Serial No. 275,843 filed concurrently with this application (now Patent 3,167,928) where also are described other methods which may be used to periodically increase the pressure in the first effect separator 1. These may be used as alternative methods or used in any desired combinations as is described in said copending application. Said application is incorporated into this specification and application by this reference.

In the above system, I may employ as valve 32 a valve having the characteristics that it maintains the volume flow rate from the pump 22 to the heater 7 and separator 1 substantially constant. So called constant flow valves are known to the art, these may be used. I have found, however, that the valve of my invention illustrated in FIGS. 4 and 7 is particularly useful for the purposes of my invention for service in the process of refrigeration described above.

The valve of my invention is of a design in which the area of the valve orifice changes with change in head so that, in a practical manner and to a practical degree, at various values of the pressure head across the valve, over the ranges of pressure difference of interest, the volumetric flow rate through the valve remains substantially constant. To accomplish this result, the valve has an orifice positioned in a movable valve member separating the input and the output ports of the valve. The valve member is resiliently positioned on an elastic support member in such manner that the valve member is displaced to a degree depending on the pressure difference across the orifice, between the input and output ports. Upon displacement of the valve member from one position to a new position on variation of this pressure difference, as the valve member moves to a new position, the elastic member is stressed in opposition to the movement of the valve member. The displacement of the valve member, on increase in pressure difference causes a portion of the orifice to be closed, thus reducing the orifice area in the amount required to maintain a substantially constant volumetric flow of liquid.

The tubular valve case 57 (see FIGS. 4–7) having an entrance port 58 connected to the discharge of the pump, for example, pump 22 of FIG. 1, includes a ballcheck valve seat 59 which is closed by the ball 60 when the pressure head is properly directed as will be described below. The bottom of the case 57 carries a bar 61 with an axial bore 62. The ring 63, with a depending flange 64, is positioned and welded in place. The displaceable valve member 65 is a hollow cylinder closed near the top by the closure 66, to which is rigidly attached a depending rod 67 (shown broken away for purposes of clearer illustration) axially positioned in the valve member 65 and the case 57 and passing through the bore 62. The coil spring 68 is positioned to extend from the bar 61 around the rod 67 and inside the cylindrical member 65 and against the closure of 66 biasing the valve member to a position extending above the ring 63.

The tubular cylinder 65 may be moved axially biased by the spring 68 through the ring 63, a suitable clearance or gap 69 being provided between the ring 63 and the exterior surface of the cylinder 65. A bore 70 may or may not be provided in the case 57 on the upstream side of the ring 63, to provide communication between the chamber 71 inside the case 57 and the space 72 between the case 57 and the tubular housing 73 in which the case 57 is positioned by fitting 74. The housing may be connected in line 26′ of FIG. 1 to act as the valve 32. The bar 61 leaves open areas 75 at the end of the case 57 to provide for a discharge port to communicate with the interior of the housing 73 and the discharge outlet 74.

It will be observed that cylinder 65 forms a spring-biased piston with a piston head 66, to move the cylinder 65 in response to pressure differences above and below the piston head 66.

The cylinder 65 is provided with two opposite similar characterized ports 76 of generally triangular configuration positioned on opposite sides of the cylinder and so positioned that when no pressure difference occurs above and below the piston head 66, a predetermined portion of the characterized orifice is above the top of the ring 63 as will be more fully described below.

In such condition the ball 60 is seated on top of the cylinder 65. As pressure is applied through 58, a pressure difference appears across the orifice 76, the cylinder 65 is depressed through the ring 63 and the exposed area of the port 76 upstream of the ring 63 is reduced in magnitude, and the ring takes some position along the sides 77 of the orifice 62. The flow rate through the valve depends on the area of the orifice 76 positioned upstream of the ring 63, and also the area of the gap 69 and the area of the port 70 if this port is used. The sides 77 of the port 76 are of such contour that the geometric form of the area of the port opening on the upstream side of the ring 63, will then have the required relationship to the longitudinal movement of the cylinder 65 and the pressure difference, so that considering the area of the gap 69 and the area of the port 70, if used, the volumetric flow rate through the valve is substantially constant as the pressure difference changes.

The valve thus has a variable orifice whose opening changes with change in pressure difference in such manner to keep the volumetric flow substantially constant. The volume (Q) flowing per unit of time through an orifice of area A having an orifice coefficient of C, under a head (pressure difference) H is $$Q = CA(H)^{1/2}$$

If H changes in order to keep Q constant, A must change.

Two conditions may be present, one in which the total orifice available for the passage of fluid is that contained in the movable valve member 65, the bore 70 being sealed and the gap being suitably sealed by a bellows or other flexible annular diaphragm connecting the ring 63 and the cylinder 65 (not illustrated but as will be clear to one skilled in the art), and a second case in which auxiliary passages of the gap and bore 70 provide for parallel flow. The design illustrated in FIGS. 4–7 provides the auxiliary orifices.

In the first case where the total flow passes through the orifice in a movable valve member, the following conditions appear. Since the movable member is resiliently suspended it is subjected to a displacement as a result of the applied pressure difference, i.e., head H, the difference in pressure in the chamber 71 and in the chamber 72. The relationship between the displacement of the movable member on its resilient support and the head H applied to the effective area of the movable member 65, is given by the following Equation 1 where $k$ is the spring constant of the resilient suspension of the cylinder and D is the displacement of the cylindrical case 65 through the ring 63 occurring on imposition of the pressure head H.

Under these conditions, the ball 60 is seated on the top of the cylinder 65 and pressure in the case is exerted across the area ($a$) equal to the area of the cross-section of 65 taken at the closure 66.

Referring to FIGS. 4–6, it will be seen that as H varies, the linear displacement of the cylinder 10 through the ring is proportional to the value of H. The force F on the piston head 66 is $$F = H(a) = kD \qquad (1)$$

$$H = \frac{k}{a} D = KD$$

From what has been said above, the following relationships appear:

$$Q = CA(H)^{1/2} = CA K^{1/2}(D)^{1/2} \qquad (2)$$

$$A = \frac{Q}{CH^{1/2}} = \frac{Q}{C[KD]^{1/2}} \qquad (3)$$

Thus, if the area is made to be a linear function of the reciprocal of the square root of the head H or the displacement D, the value of Q will remain constant. Ideal linearity may not be of practical moment but the deviation of Q from a constant should be within the practical limits required to overcome in a practical manner the deleterious effects of variations in Q described above.

As stated above, the orifice area for the passage of fluid from the input to the output port of the valve may also include fixed area orifices whose cross-sectional area does not change with the displacement. Such orifices are the gap 69 and the orifice 70. If $A_2$ is the sum of the port areas of the fixed ports, and the pressure head H across the variable orifice $A_1$, is the same as that across the fixed orifices, the following relationship appears:

Where Q is the total volumetric flow and $Q_1$ is the flow through the variable port $A_1$, and $Q_2$ is the flow through the fixed area ports $A_2$,
$Q_1$ is the volume flow through orifice $A_1$,
$Q_2$ is the volume flow through the orifice $A_2$.

The head H is across each orifice. The orifice constant C may be taken as the same for all orifices.

$$Q_1 = CA_1(H)^{1/2} = CA_1[KD]^{1/2}$$

$$Q_2 = CA_2(H)^{1/2} = CA_2[KD]^{1/2}$$

The total volume flow Q is:

$$Q = Q_1 + Q_2 = C(A_1 + A_2)(H)^{1/2} \qquad (4)$$

$$A_1 + A_2 = \left[\frac{Q}{C(H)^{1/2}}\right] = \left[\frac{Q}{CK^{1/2}(D)^{1/2}}\right] \qquad (5)$$

$$A_1 = \left[\frac{Q}{CK^{1/2}(D)^{1/2}}\right] - A_2 \qquad (6)$$

In the second case, as in the first case, if the variable orifice area is a linear function of the value $(D)^{1/2}$ or $(H)^{1/2}$, Q will be constant with change in H.

From Equation 6, it will be seen that having chosen the spring and therefore fixed the value of K for the design of the valve which is desired, and having selected the value of Q, the area of the orifice 62 is made so that at each value of the displacement D resulting from head H satisfies Equation 6.

This establishes the character of the spring and the total area of the orifice and the nature of the orifice variation to maintain the flow rate constant as the head varies. It will be seen that for any construction of the device chosen, having thus established $A_1$ at the value Q desired, if it is found that the flow does not meet the conditions established, a change in the port area $A_2$ i.e. the gap or the auxiliary port 70 will provide the desired relation. This may be done by increasing or decreasing the dimension of the port 70.

Let $2b$ be the arcuate dimension of the area $A_1$ (see FIG. 8) measured around the cylinder on the plane perpendicular to the axis of the cylinder.

By differentiation of Equation 6

$$dA_1 = 2(b)dD = d\left[\frac{Q}{Ck^{1/2}(D)^{1/2}}\right] \qquad (6a)$$

$$dA_1 = 2(b)dD = -\left[\frac{Q}{2CK^{1/2}}\right](D)^{-3/2}dD$$

$$dA_1 = 2(b)dD = -\left[\frac{Q}{2CK^{1/2}}\right](D)^{-3/2}dD$$

$$b = -\left[\frac{Q}{4CK^{1/2}}\right](D)^{-3/2}$$

$$b = -\left[\frac{Q}{4CK^{1/2}}\right](D)^{-3/2} \qquad (7)$$

Figure 8:
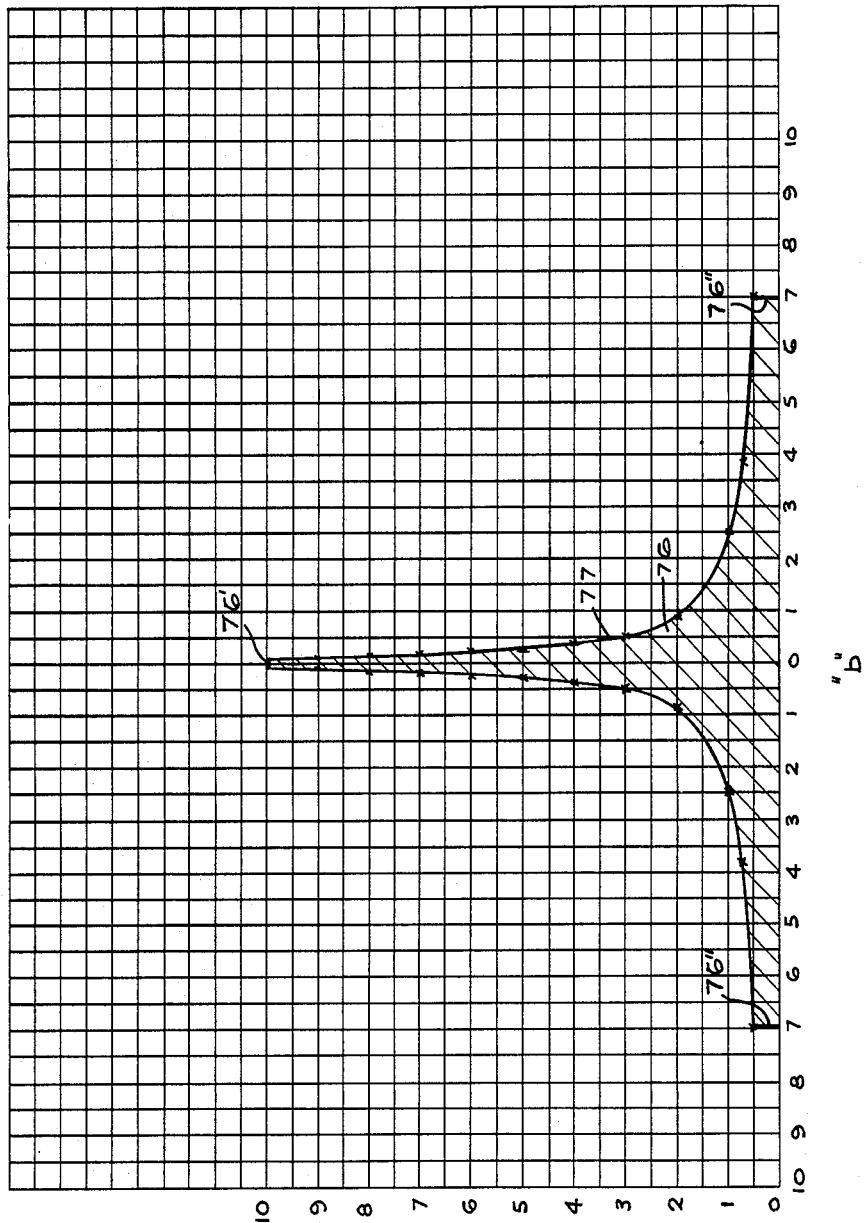
FIG. 8 is a plot of the characterized part of the valve shown in FIG. 4.

It will be seen from an inspection of FIG. 8 that D is also the vertical height of the area and $2b$ the horizontal distance between sides. Having established an area and displacement D at any chosen H, the area is designed so that $2b$ varies inversely as the 3/2 power of D; from D at the minimum value of H and D to that at the maximum value of D and H over which the valve is to operate.

The contour shown in FIG. 8 was obtained by solving Equation 7. Assuming the fraction $$\left[\frac{Q}{4CK^{1/2}}\right]$$

equals 5 the areas are as shown on FIG. 8 where area 76 is the area $A_1$ for the above fraction, using arbitrary units for the displacement D and the horizontal dimension b being thus in like units. FIG. 8 plots the dimension b from a central axis of the orifice.

It will be seen from Equations 6 and 7 that in order for both to be satisfied, the sides 63 must extend to infinity. For practical purposes, they are cut off at 76' and 76" where they, for practical machining purposes, meet. This is shown on FIG. 8 as being at $D=10$ units and at $D=0.50$ unit. The difference between the area 76 as shown on FIG. 8 and that obtained from integration of Equation 7 (the integral of the Equation 6a including the value of $A_2$) is obtained by the proper design of the gap 64 and the hole 70. The hole 70 may be increased or decreased in order to obtain the desired value of Q.

This may be done by impressing a pressure just necessary to depress the valve member to the lower end of the variable orifice and measuring the volume rate of discharge. The diameter of 70 may be adjusted to obtain the desired value of Q. This adjustment is in the nature of a vernier adjustment and need control but a few percent of the flow rate.

It will thus be seen that as pressure varies in the first-effect separator on the regeneration zone, the flow is regulated by a throttle valve which is self-regulating in response to the pressure in the regeneration zone, and is thus responsive to the head established by the pump across said throttle valve orifice. As the pressure rises in the first-effect separator and thus reduces the pressure head across the valve orifice, the valve orifice area increases. When the pressure falls in the first-effect separator, to increase the pressure head across the throttle valve orifice, the orifice area decreases and this way the volume flow rate remains substantially constant with changes in pressure in the first-effect separator.

Another feature of the design of the valve of my invention is the incorporation of a check valve. In the normal operation where the high pressure side of the valve is at the port 58, the ball is seated on the cylindrical valve member 65. Should, however, a reverse pressure surge occur, so that the pressure at the port 74 is higher than that of port 58, the cylinder will be moved to move the ball towards seat 59. The ball on the cylinder having been brought sufficiently close to the seat 58, the ball is seated against the seat 59, at which time it is held against the seat by the pressure in 71 acting on the surface of the ball to hold it against its seat.

It will be noted that if desired, the ball may be omitted when it is desired that the valve does not act as a check valve also.

When using the ball in the valve, the case 71 is preferably arranged in a vertical position.

While I have described a particular embodiment of my invention for purposes of illustration, it should be understood that various modifications and adaptations thereof may be made within the spirit of the invention, as set forth in the appended claims.

I claim:

1. A method for absorption refrigeration which comprises absorbing refrigerant vapors in absorption liquid in an absorption zone, removing absorption liquid from the absorption zone and passing the liquid under pressure into a regeneration zone, where it vaporizes under pressure more elevated than in the absorption zone, removing the unvaporized liquids, condensing vapors generated in the regeneration zone, passing the unvaporized absorption liquid into said absorption zone, condensing the generated vapors in a condensation zone, passing the condensate produced in said condensation zone to an evaporation zone in vapor communication with said absorption zone, vaporizing said condensate in said evaporation zone, absorbing vapors generated in the evaporation zone in the absorption liquid in said absorption zone, in which method the pressure in said regeneration zone varies, the step of regulating the volumetric flow rate of the circulating absorption liquid passing from the absorption zone to the regeneration zone, responsive to the pressure variations in said regeneration zone to maintain said flow rate substanially constant, substantially irrespective of said pressure variation.

2. In the process of claim 1, in which said absorption liquid is a salt solution, and said vapors are water vapors, and in which said vapors in said condensation zone contain uncondensed gases, passing said gases into an acmumulation zone closed from ambient pressure, accumulating said gases in said closed accumulation zone under a pressure less than ambient pressure, periodically raising the pressure in said accumulation zone to a pressure higher than ambient pressure and venting such gases from the accumulation zone to ambient pressure and maintaining said gases during said venting step at a pressure higher than ambient pressure, discontinuing said venting and closing said acccumulation zone from ambient pressure and reducing the pressure in said regeneration zone.

3. A method for absorption refrigeration which comprises absorbing refrigerant vapors in an absorption zone in an absorbing liquid, removing said liquid from said absorption zone and passing the same under pressure, through an orifice of variable area under a pressure difference existing across said orifice, to a regeneration zone where it is vaporized under pressure in said regeneration zone, passing unvaporized liquid into said absorption zone, condensing said vapors generated by said vaporization in a condensation zone to form a condensate, evaporating said condensate in an evaporation zone in vapor communication with said absorption zone, absorbing vapors generated in said evaporation zone, in the liquid introduced into the absorption zone, said pressure in said regeneration zone varying the said orifice responsive to said pressure difference across said orifice, to maintain a substantially constant flow rate of liquid passing to said regeneration zone, irrespective of the pressure variations in said regeneration zone.

4. In the process for refrigeration of a fluid which comprises:
(A) heating an aqueous salt solution containing uncondensed gas to its vaporization point, at a relatively elevated temperature and pressure, to produce a partially concentrated salt solution and water vapor and uncondensed gas;
(B) separating said vapor and fixed gas from said partially concentrated salt solution in a separating zone under substantially said pressure;
(C) withdrawing and cooling said partially concentrated salt solution;
(D) condensing said water vapor in a condensing zone in indirect heat exchange, said cooled partially concentrated salt solution passing from said separating zone specified in (B) above;
(E) withdrawing uncondensed gases from said condensation zone and accumulating said fixed gases in a closed gas accumulation zone;
(F) establishing a pressure above ambient pressure in said accumulation zone;
(G) discharging said uncondensed gas from said zone of accumulation to ambient pressure and maintaining the pressure in said separating zone and in said gas accumulation zone above ambient pressure during said venting of fixed gases;
(H) partially vaporizing said salt solution during its passage in heat exchange referred to in (D) above, to form a further concentrated salt solution and water vapor at a lower pressure than in said separating zone referred to in (A) above, separating vapors from said further concentrated salt solution at said lower pressure in a second separating zone, withdrawing water vapors and further concentrated salt solution from said second separating zone;
(I) condensing said last named vapors to form a condensate in a second condensing zone at a lower pressure than in the separating zone referred to in (A) above;

(J) introducing said last named condensate into a refrigerant evaporation zone maintained at a pressure lower than in the lower pressure separating zone referred to in (H) above, and vaporizing said condensate in heat exchange with fluid to be refrigerated;

(K) passing said last named vapor produced as specified in (J) above into an absorption zone, contacting said vapor and gas present in said absorption zone with cooled concentrated salt solution in said absorption zone and thus establishing the low pressure in said refrigerant evaporation zone specified in (J) above;

(L) withdrawing salt solution containing fixed gas from said absorption zone and passing the same to the heating step specified in (A) above under pressure through an orifice of variable area under a pressure differential responsive to the pressure in said separating zone referred to in (A) above;

(M) varying the area in said orifice to maintain the volumetric flow rate of the salt solution passing to said heating step responsive to the pressure in said separating zone specified in (B) above, to maintain said flow rate substantially constant irrespective of the pressure variations in said separating zone specified (B) above.

5. In the process of claim 4 in which said pressure in said accumulation zone specified in (E) of claim 4, is below atmospheric, the step which comprises raising the pressure in said condensing zone specified in (D) of claim 4 to super-ambient pressure and maintaining a super-ambient pressure in said gas accumulation zone during said venting step.

6. In the process of claim 5, said step of raising the pressure in said condensing zone comprising, by-passing salt solution passing from said separating zone specified (B) of claim 4 above, into the further concentrated liquid specified in (H) of said claim 4, and thereby raising the pressure in said gas accumulating zone.

7. An absorption refrigeration apparatus comprising a heater, a liquid passageway in said heater, heated by said heater, a separator in fluid communication with said liquid passageway, a condenser in vapor communication with said separator, an absorber, means to transport liquid from said separator to said absorber, an evaporator, means to transport condensate from said condenser to said evaporator, means to pass fluid to be refrigerated in heat exchange with liquid in said evaporator, and a vapor communication passageway between said evaporator and said absorber, vapor and gas discharge passageway from said first named condenser, a gas accumulation chamber connected to said condenser and a vent valve connected to said chamber, pressure sensitive means connected to the said condensing zone, means operatively connected to said pressure sensitive means to open and close said valve responsive to said presure in said condensing zone, a centrifugal pump and a line connecting said pump to said heater and a line connecting said pump to said absorber, and a constant flow valve in said line connecting the pump to said heating passageway.

8. An absorption refrigeration apparatus comprising a heater, a liquid passageway in said heater, said passageway heated by said heater, a separator in fluid communication with said passageway, a condenser in vapor communication with said separator, and absorber, means to transport liquid from said separator to said absorber, an evaporator, means to transport condensate from said condenser to said evaporator, means to pass fluid to be refrigerated in heat exchange with the liquid in said evaporator, and a vapor communication passageway between said absorber and said evaporator, a vapor and gas discharge passageway from said first named condenser, a valve in said discharge passageway, means in said discharge passageway responsive to a condition in said condenser to open and close said valve responsive to said condition, a centrifugal pump and a line connecting said pump to said absorber, and a constant flow valve in said line connecting said pump to said heater.

9. A multiple effect absorption refrigeration apparatus comprising a first-effect separator, first-effect condenser in vapor communication with said first-effect separator, a second effect separator, a second-effect condenser in vapor communication with said second-effect separator, an absorber, a refrigerant evaporator in vapor communication with said absorber, a heater, a liquid flow line connected to said absorber and to said first-effect separator through said heater, a centrifugal pump in said liquid flow line and a constant flow valve in said line on the discharge side of said pump, means to pass liquid from said first-effect separator to heat exchange with a vapor in said first-effect condenser, into said second-effect separator, means to pass condensate from the first-effect condenser and said second-effect condenser into said evaporator, means to pass liquid from said second-effect separator into said absorber.

10. The apparatus of claim 9, a gas discharge conduit connected to said first-effect separator and a vent valve in said gas discharge line, a pressure sensitive means connected responsive to pressure in said first-effect condenser and operatively connected to said vent valve, and means to open and close said valve responsive to pressure levels in said first-effect condenser and to hold said valve open while pressure is maintained above ambient pressure in said condenser and closing said valve under a predetermined interval of time while said pressure is above ambient.

11. The apparatus of claim 10, means to raise the pressure in said separator to a predetermined level at which said pressure sensitive means opens said valve.

12. The apparatus of claim 11, said means to raise the pressure comprising a by-pass connection between said first-effect separator and said absorber, a valve in said by-pass and means operatively connected to said pressure sensitive means to open and close said valve in said by-pass.

13. In a method for absorption refrigeration which comprises absorbing refrigerant vapors in absorption liquid in an absorption zone, removing absorption liquid from the absorption zone and passing the liquid into a regeneration zone, where it vaporizes under pressure more elevated than in the absorption zone, removing the unvaporized liquid, condensing vapors generated in the regeneration zone, passing the unvaporized absorption liquid into said absorption zone, condensing the generated vapors in the condensation zone, passing the condensate produced in said condensation zone to an evaporation zone in vapor communication with said absorption zone, vaporizing said condensate in said evaporation zone in the absorption liquid in said absorption zone, the step of regulating the volumetric rate of circulation of absorption liquid passing from the absorption zone to the regeneration zone to maintain said volumetric rate substantially constant throughout cycles of operation.

References Cited by the Examiner

UNITED STATES PATENTS

| | | | |
|---|---|---|---|
| 696,074 | 3/1902 | Osmer | 137—473 |
| 2,320,349 | 6/1943 | Cropper | 62—476 X |
| 2,565,943 | 8/1951 | Berestneff | 62—141 |
| 2,582,838 | 1/1952 | Leonard | 62—148 |
| 2,703,968 | 3/1955 | Berestneff | 62—475 |
| 2,948,296 | 8/1960 | Thorburn | 137—517 |
| 2,959,935 | 11/1960 | Leonard | 62—475 X |
| 2,960,109 | 11/1960 | Wilson | 137—513.3 X |
| 2,969,084 | 1/1961 | Raymond | 137—471 |
| 3,080,885 | 3/1963 | Webster et al. | 137—471 |
| 3,081,605 | 3/1963 | Leonard | 62—475 X |
| 3,122,002 | 2/1964 | Miner et al. | 62—483 X |

ROBERT A. O'LEARY, *Primary Examiner.*